(12) United States Patent
Wells et al.

(10) Patent No.: US 11,817,686 B1
(45) Date of Patent: Nov. 14, 2023

(54) WIRE-MOUNTING DEVICE FOR AN ELECTRICALLY-ENABLED GLASS ASSEMBLY

(71) Applicant: Aisin Technical Center of America, Inc., Northville, MI (US)

(72) Inventors: Alex Wells, New Hudson, MI (US); Mike Mixon, Brighton, MI (US)

(73) Assignee: AISIN Technical Center of America, Inc., Northville, MI (US)

( * ) Notice: Subject to any disclaimer, the term of this patent is extended or adjusted under 35 U.S.C. 154(b) by 0 days.

(21) Appl. No.: 17/882,854

(22) Filed: Aug. 8, 2022

(51) Int. Cl.
  *H02G 3/04* (2006.01)

(52) U.S. Cl.
  CPC .................................. *H02G 3/0456* (2013.01)

(58) Field of Classification Search
  CPC .............................. H02G 3/0456; B62D 25/04
  USPC ....................................................... 174/70 R
  See application file for complete search history.

(56) References Cited

U.S. PATENT DOCUMENTS

| | | | |
|---|---|---|---|
| 2,385,209 A * | 9/1945 | Joyce | F16L 3/24 24/339 |
| 4,278,286 A * | 7/1981 | Kiba | B60J 10/265 52/716.6 |
| 6,817,658 B2 | 11/2004 | Ohnishi et al. | |
| 7,905,542 B2 | 3/2011 | Marx et al. | |
| 9,079,475 B1 | 7/2015 | Zichettello et al. | |
| 10,293,668 B1 | 5/2019 | Foss et al. | |
| 10,525,801 B1 | 1/2020 | Mixon et al. | |
| 10,594,118 B1 * | 3/2020 | Abadi | H02G 3/0456 |
| 2007/0079564 A1 * | 4/2007 | DiMario | E05C 3/004 52/208 |
| 2019/0074674 A1 * | 3/2019 | Martin | H02G 3/32 |
| 2021/0057897 A1 * | 2/2021 | Naugler | H01R 4/64 |
| 2022/0200523 A1 * | 6/2022 | Truthseeker | H02S 40/34 |
| 2022/0356963 A1 * | 11/2022 | Michael | F16L 3/127 |

* cited by examiner

*Primary Examiner* — Timothy J Thompson
*Assistant Examiner* — Michael F McAllister
(74) *Attorney, Agent, or Firm* — Christopher G. Darrow; Darrow Mustafa PC

(57) ABSTRACT

A wire-mounting device is provided for securing a portion of at least one wire to a piece of glass. The device includes a wire-engaging portion and a positioning portion extending from the wire-engaging portion. The positioning portion is structured to contact an edge of the piece of glass to position the wire-engaging portion at a predetermined distance from the edge of the piece of glass. An overmold is applied along the edge of the glass to encapsulate the wire-mounting device and the attached wire.

18 Claims, 7 Drawing Sheets

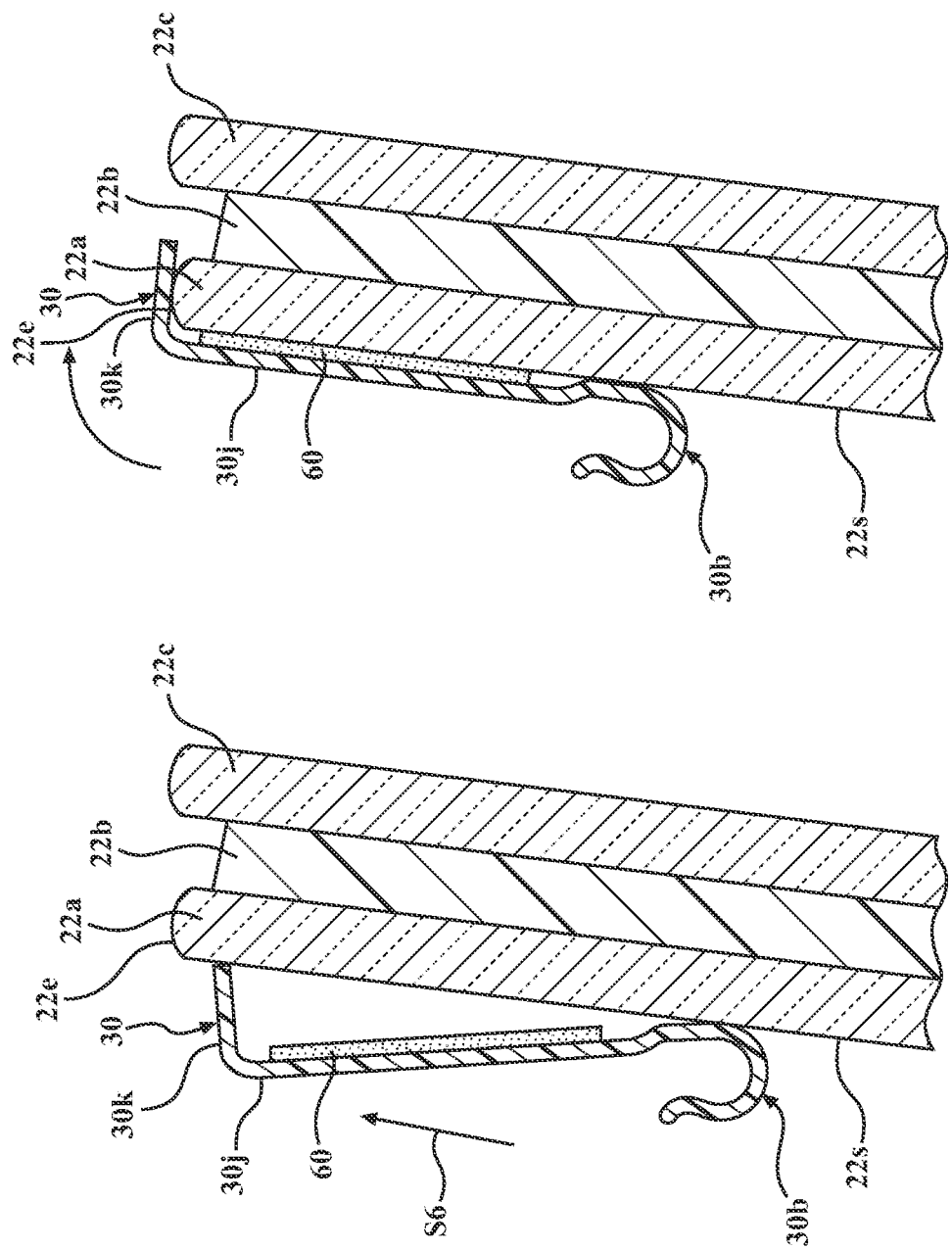

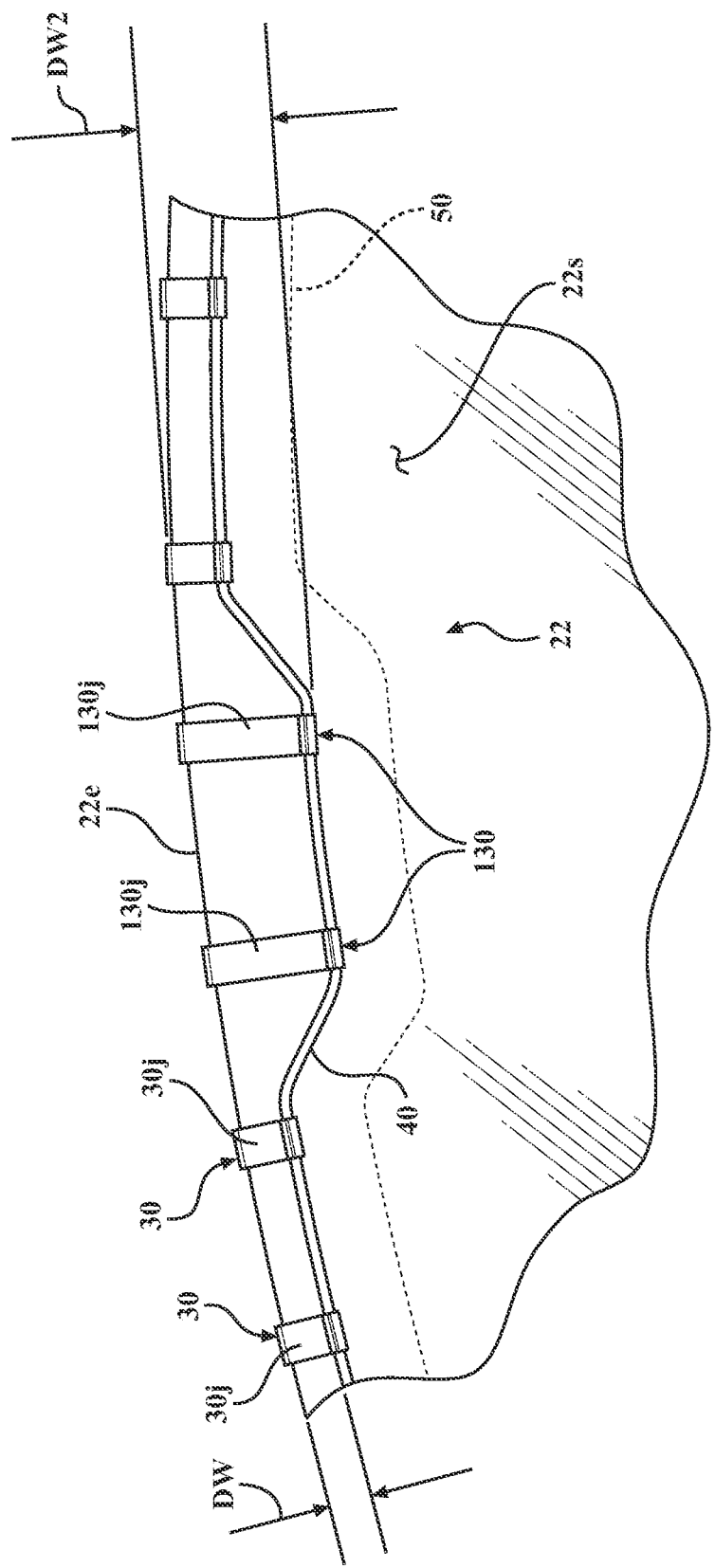

WIRE-MOUNTING DEVICE FOR AN ELECTRICALLY-ENABLED GLASS ASSEMBLY

TECHNICAL FIELD

The embodiments disclosed herein relate to devices for positioning and supporting wires and, more particularly, to a device for supporting a wire along a surface of a piece of glass, at a desired location with respect to an edge of the piece of glass.

BACKGROUND

It is sometimes necessary to position and attach one or more wires to a particular location on an exterior surface of a piece of glass. For example, in a vehicle rear window assembly incorporating an electric defroster wire matrix, it may be necessary to attach portions of the wire to an outer surface of the window during fabrication. The attached wire may then be secured in position using an overmolding operation.

A method of attaching the wire to the glass may include wrapping the wire in a layer of double-sided tape and pressing the enclosed wire against a desired location on the glass. This method of wire attachment has several drawbacks. In some cases, it is desired to position the wire accurately and consistently with respect to a reference feature (for example, an edge of the glass). The desired wire attachment locations and path may be indicated using a jig, a laser beam, or markings scribed into the glass. A human operator then attaches the wire along the indicated path. However, mistakes and inconsistencies in positioning may arise due to operator error and movement of the wire after placement. In addition, this method of wire attachment is slow and difficult because the tape sticks to the operator's hands or gloves during attachment of the wire to the glass.

SUMMARY

In one aspect of the embodiments described herein, a wire-mounting device is provided for securing a portion of at least one wire to a piece of glass. The device includes a wire-engaging portion and a positioning portion extending from the wire-engaging portion. The positioning portion is structured to contact an edge of the piece of glass to position the wire-engaging portion at a predetermined distance from the edge of the piece of glass.

In another aspect of the embodiments described herein, an electrically-enabled glass assembly for a vehicle is provided. The assembly includes a piece of glass and at least one wire-mounting device engaging an edge of the piece of glass and a portion of at least one wire so as to secure the portion of the at least one wire at a predetermined distance from the edge of the piece of glass.

In another aspect of the embodiments described herein, a method is provided for attaching at least one wire to a piece of glass for fabricating an electrically-enabled glass assembly. The method includes steps of enabling a device securement element along a positioning portion of a wire-mounting device structured to be securable to the piece of glass, positioning a catch portion of the wire-mounting device so as to engage an edge of the piece of glass, moving the positioning portion of the wire-mounting device so that the device securement element contacts the piece of glass (thereby securing the wire-mounting device positioning portion to the piece of glass), and mounting a wire in a wire-engaging portion of the wire-mounting device.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale. Additionally, for simplicity and clarity of illustration, and where appropriate, corresponding or analogous elements of different embodiments of the invention appearing in different figures may have similar reference numerals.

FIG. 7A is a schematic partial side view of the electrically-enabled glass assembly 20 shown in FIGS. 1-3, showing a first step of an alternative method of attaching an embodiment of the wire-mounting device to the piece of glass.

FIG. 7B is the schematic partial side view of FIG. 7A, showing a final step of the alternative method of attaching an embodiment of the wire-mounting device to the piece of glass.

FIG. 8 is a schematic plan view of an electrically-enabled glass assembly similar to the assembly shown in FIG. 1, showing an embodiment of an alternative arrangement for securing a wire to a piece of glass.

DETAILED DESCRIPTION

This disclosure relates to a wire-mounting device for securing a portion of at least one wire to a piece of glass. The device includes a wire-engaging portion and a positioning portion extending from the wire-engaging portion. The wire-engaging portion may grip the wire, and the positioning portion may be structured to contact an edge of the piece of glass to position the wire-engaging portion at a predetermined distance from the edge of the piece of glass, thereby enabling accurate and consistent location of the wire with respect to the edge of the piece of glass. The positioning portion may be secured in a desired position along an exterior surface of the glass using tape or adhesive that is pre-applied to the positioning portion.

Figure 1:
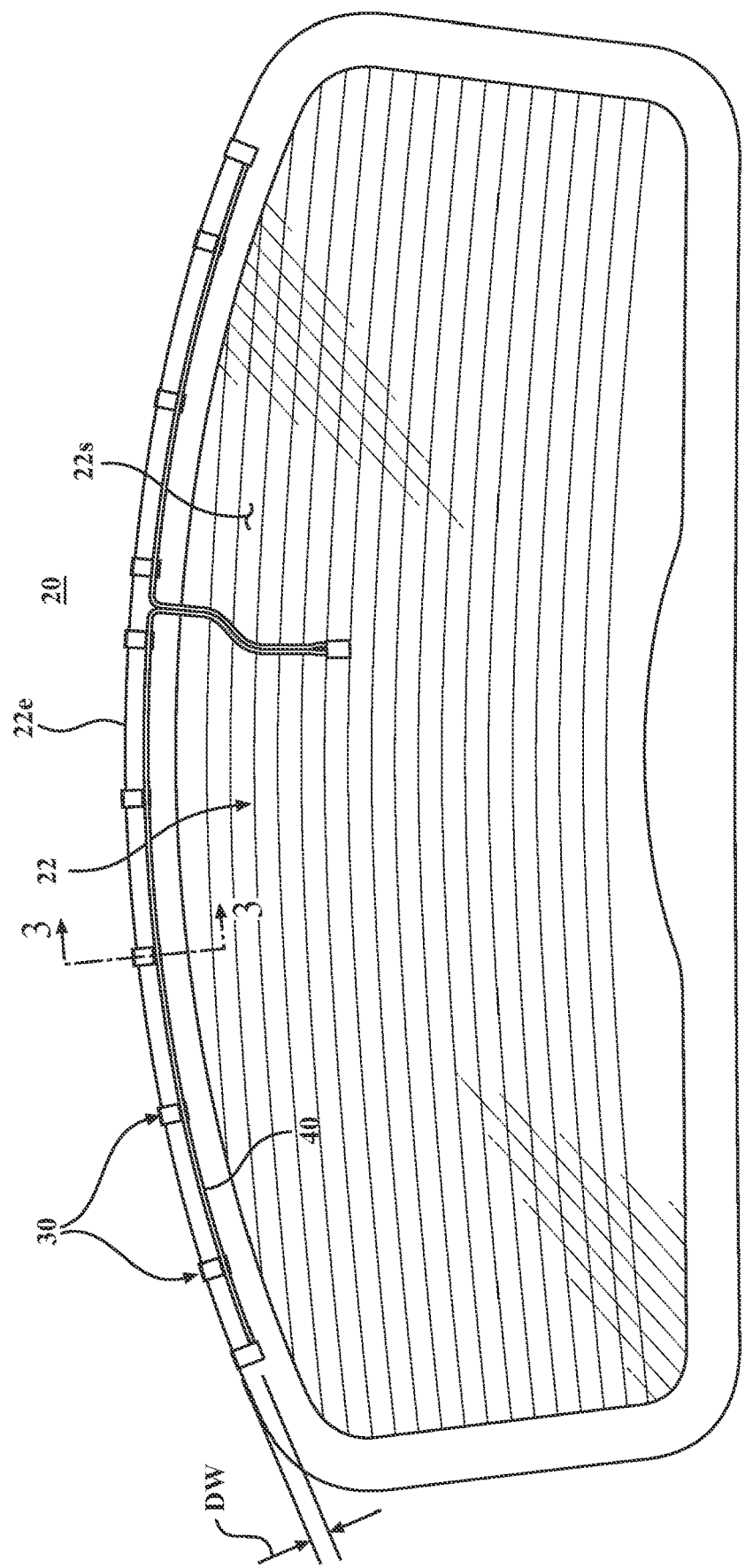
FIG. 1 is a schematic plan view of an electrically-enabled glass assembly for a vehicle, showing a wire secured to a piece of glass by multiple wire-mounting devices and prior to application of an overmold along an edge of the piece of glass.
Figure 2:
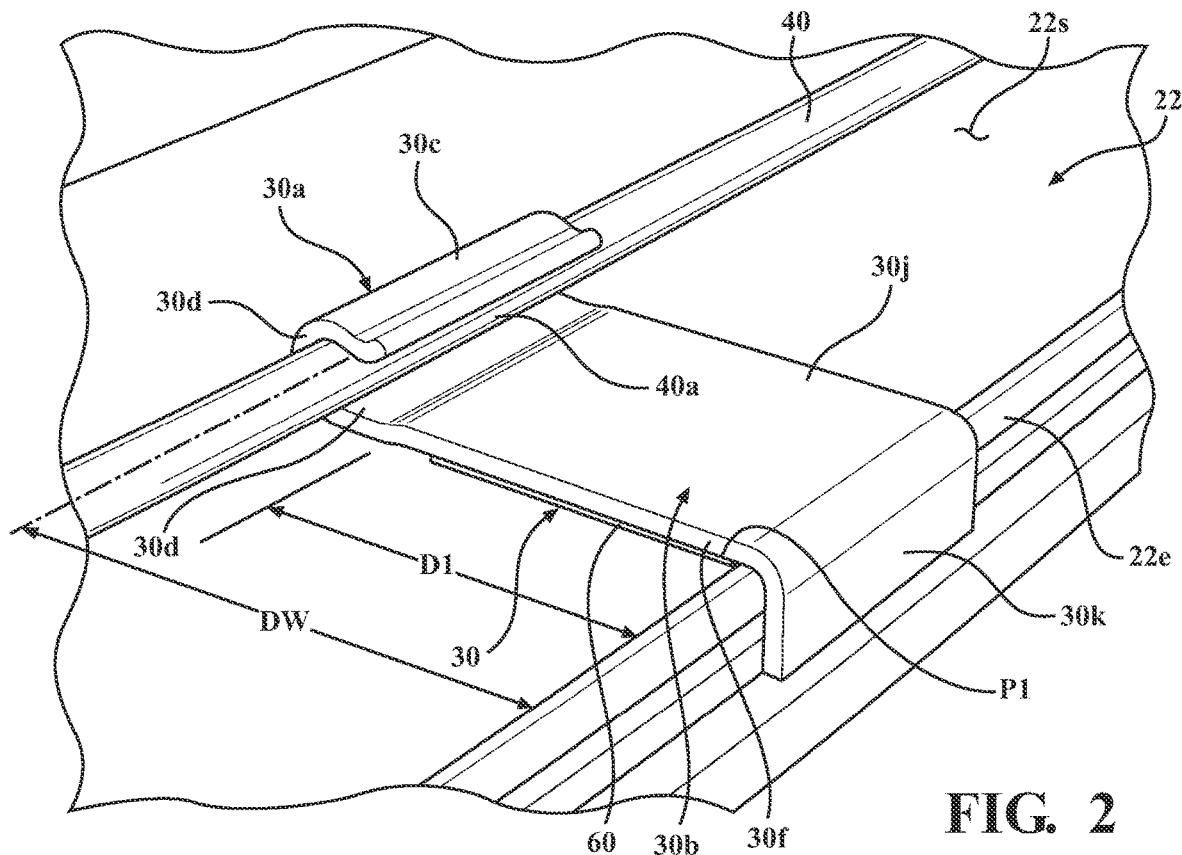
FIG. 2 is a schematic perspective view of a portion of the electrically-enabled glass assembly shown in FIG. 1, incorporating an embodiment of a wire-mounting device structured for securing a portion of at least one wire to a piece of glass.
Figure 3:
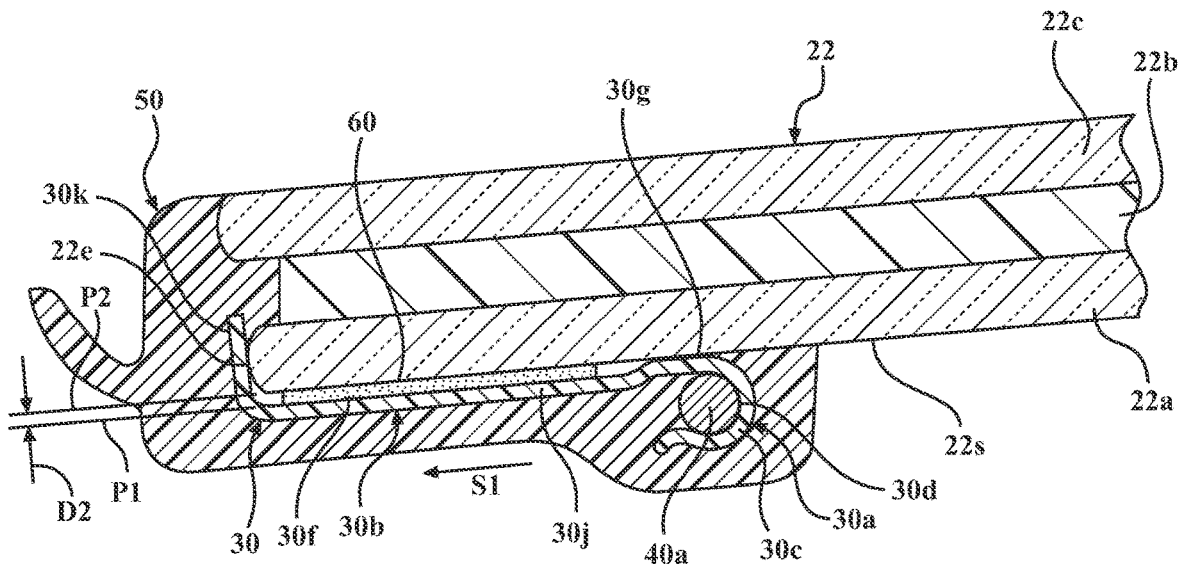
FIG. 3 is a schematic partial cross-sectional edge view of the portion of the glass assembly shown in FIG. 2.

Referring to FIGS. 1-3, FIG. 1 is a schematic plan view of an electrically-enabled glass assembly 20 for a vehicle. The assembly may include at least one piece of glass 22 and at least one wire-mounting device 30 engaging an edge 22e of the piece of glass 22 and a portion(s) of at least one wire 40 so as to secure the portion(s) 40a of the wire(s) at a predetermined distance DW from the edge 22e of the piece of glass 22. An "electrically-enabled glass assembly" may be a glass assembly incorporating an electrical or electronic component affixed to one or more pieces of glass by adhesive bonding, a laminating process, or any other suitable method. Examples of electrically-enabled glass assemblies which may incorporate one or more embodiments of the wire-mounting device described herein include a conventional vehicle rear window incorporating an electric defroster wire matrix, a sunroof, and other types of adjustable glass panel structures. In one or more arrangements, the piece of glass 22 in the electrically-enabled glass assembly 20 may have a laminated structure as shown in FIG. 3, with multiple layers 22a, 22b, 22c of glass and (optionally) other materials bonded or otherwise suitably attached to each other to form a single piece. One or more electrical wires 40 may be arranged along an outer surface 22s of the laminated structure 22 and secured in position along the outer surface 22s by an overmold 50 (FIG. 3) applied along the glass edge 22e, which further serves to encapsulate and protect the wire 40.

FIG. 2 is a schematic perspective view of a portion of the electrically-enabled glass assembly 20 shown in FIG. 1, incorporating an embodiment of a wire-mounting device 30 structured for securing a portion of at least one wire 40 to a piece of glass 22. The wire-mounting device 30 is shown attached to a piece of glass 22. FIG. 3 is a schematic partial cross-sectional edge view of the portion of the glass assembly shown in FIG. 2. The wire-mounting device 30 may be formed from a suitable polymer material (such as a suitable grade of Nylon) or any other suitable material. The material from which the wire-mounting device 30 is formed should be selected to ensure that the structural integrity of the wire-mounting device is maintained during the overmolding process.

In one or more arrangements, the wire-mounting device 30 may include a wire-engaging portion 30a. The wire-mounting device 30 may also include a positioning portion 30b extending from the wire-engaging portion 30a and structured to contact an edge 22e of the piece of glass 22 to position the wire-engaging portion 30a at a predetermined distance D1 from the edge of the piece of glass. The wire-engaging portion 30a may be structured to directly physically contact or engage a portion of at least one wire 40 to hold the portion of the wire in a fixed position for an overmolding operation as described herein. The wire 40 (or a portion thereof) may comprise an exposed electrical conductor or a jacketed or insulated wire, depending on the requirements of a particular application.

In the embodiment shown in FIGS. 1-3, the wire-engaging portion 30a includes a hook 30c defining a wire-receiving cavity 30d. When the wire is positioned for overmolding without the wire-mounting device 30, the flow of overmolding material impinges on the wire 40, in some cases from more than one direction. Forces exerted by the overmolding material may tend to force the wire 40 out of its desired attachment location along the surface 22s of the glass 22. The hook 30c of the wire-engaging portion 30a operates to hold the portion of the wire in position during the overmolding operation. To aid in retaining the wire 40 in the wire-receiving cavity 30d during the overmolding process, the hook 30c may be structured (with reference to a range of wire diameters to be engaged by the wire-engaging portion 30a) to exert a gripping force along at least a semi-circular exterior portion of the wire 40 when the portion of the wire 40 is received in the wire-receiving cavity 30d. The wire-receiving cavity 30d as defined by the hook 30c may open in a direction S1 extending toward the wire-mounting device positioning portion 30b.

In the embodiment shown in FIGS. 1-3, the positioning portion 30b has a flat facing surface 30f structured to face in a direction toward the piece of glass 22 when the positioning portion 30b is secured to the piece of glass. The facing surface 30f may define a first flat plane P1. in addition, the hook 30c may be structured so that a second flat plane P2 intersecting an outer surface 30g of the hook 30c and extending parallel to the first plane P1 is spaced apart a predetermined distance D2 from the first plane P1. As seen in FIG. 3, the distance D2 between the first plane P1 and the second plane P2 may allow for the positioning of a wire-mounting device securement element 60 along the positioning portion facing surface 30f. The device securement element 60 may be configured to secure the positioning portion 30b to the piece of glass 22 when the hook outer surface 30g is in contact with the piece of glass 22.

In particular arrangements, the device securement element 60 may be in the form of a piece of double-sided tape adhered to the positioning portion facing surface 30f, and the distance D2 may be equal to a thickness of the piece of double-sided tape. In other arrangements, the device securement element 60 may be in the form of a quantity of a suitable viscous adhesive applied to the positioning portion facing surface 30f, and the distance D2 may allow for application of a layer of the adhesive material to attach the positioning portion 30b to the piece of glass 22.

In embodiments described herein, the positioning portion 30b may include a catch portion 30k structured to engage the edge 22e of the piece of glass 22, and a connecting portion 30j extending between and connecting the catch portion 30k and the wire-engaging portion 30a. In one or more arrangements, the positioning portion facing surface 30f may be located along the connecting portion 30j and the wire-mounting device 30 may be attached to the piece of glass 22 along the connecting portion 30j. The length of the connecting portion 30j may be tailored according to the wire positioning requirements of a particular application, to provide a desired distance D1 from the edge 22e of the piece of glass 22 to the wire-engaging portion 30a and/or a distance DW from the edge 22e of the piece of glass 22 to a centerline of the wire 40 when the catch portion 30k engages the edge 22e of the piece of glass 22 as shown in FIGS. 2 and 3. Different versions of the wire-mounting device may be configured to provide different distances D1 and DW to enable the location(s) of respective portion(s) of wire(s) to be varied with respect to the edge 22e of the piece of glass 22. The ability to stagger the wire positioning with respect to the edge 22e of the piece of glass 22 enables any of a wide variety of wire routing patterns to be achieved, according to the requirements of a particular application.

Figure 4:
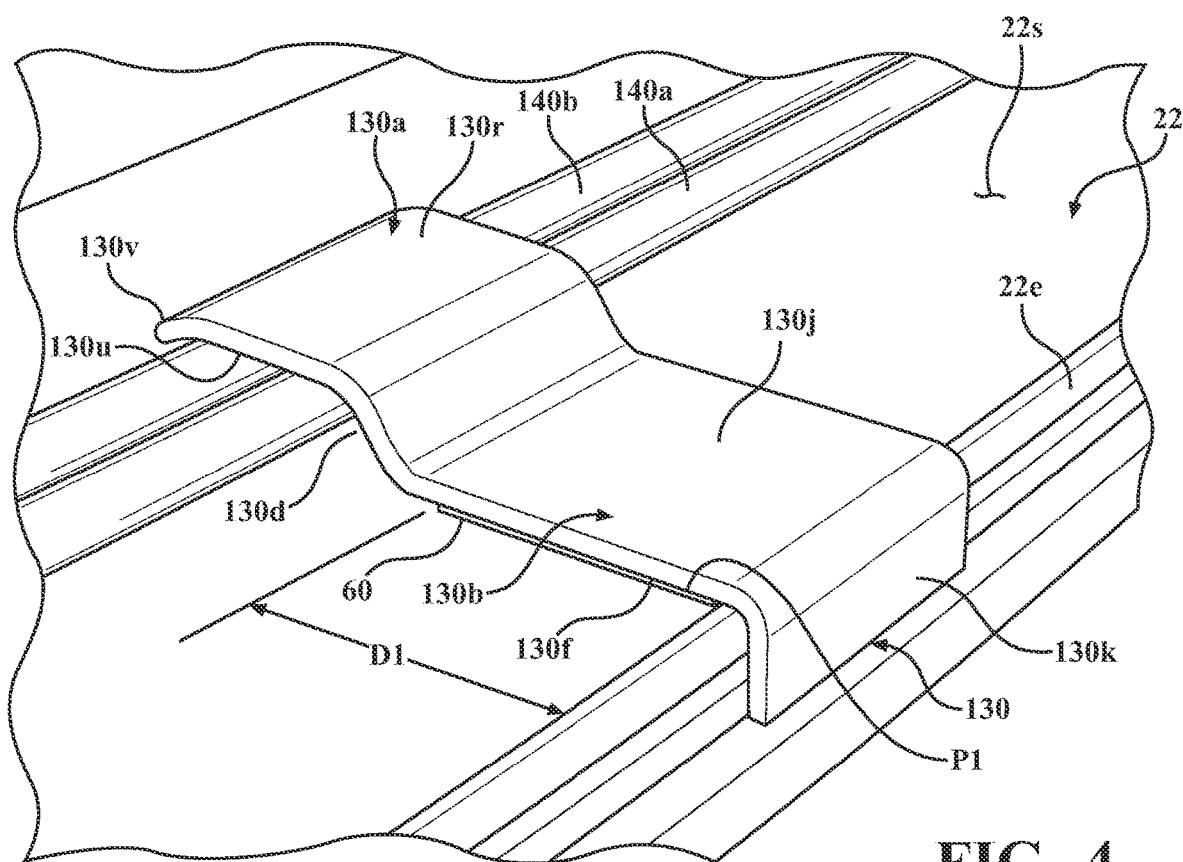
FIG. 4 is a schematic perspective view of a portion of the electrically-enabled glass assembly incorporating another embodiment of a wire-mounting device structured for securing a portion of at least one wire to a piece of glass.
Figure 5:
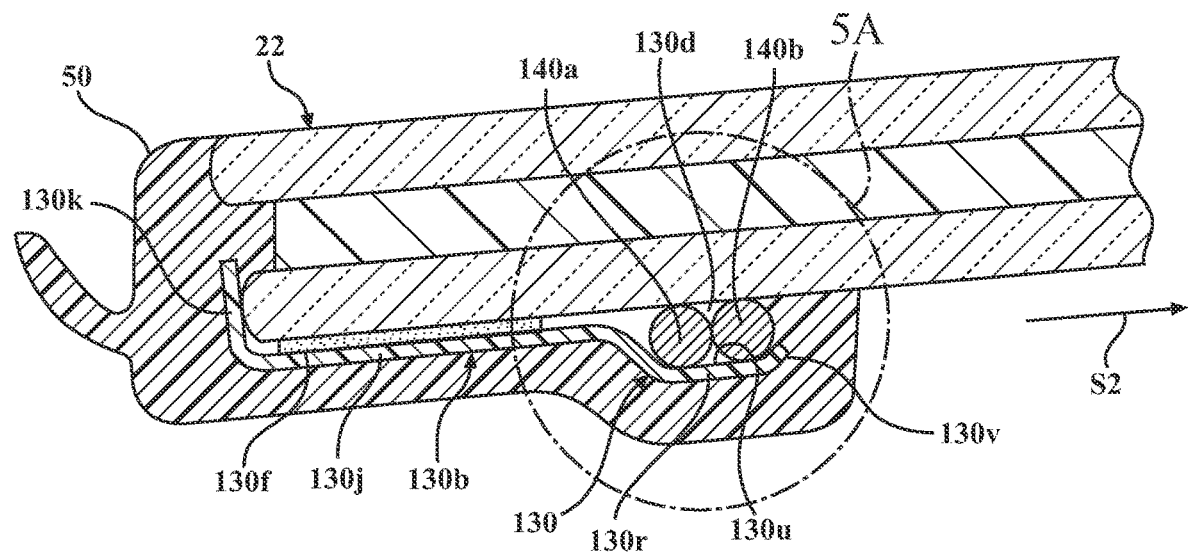
FIG. 5 is a schematic partial cross-sectional edge view of the portion of the glass assembly shown in FIG. 4.
Figure 5A:
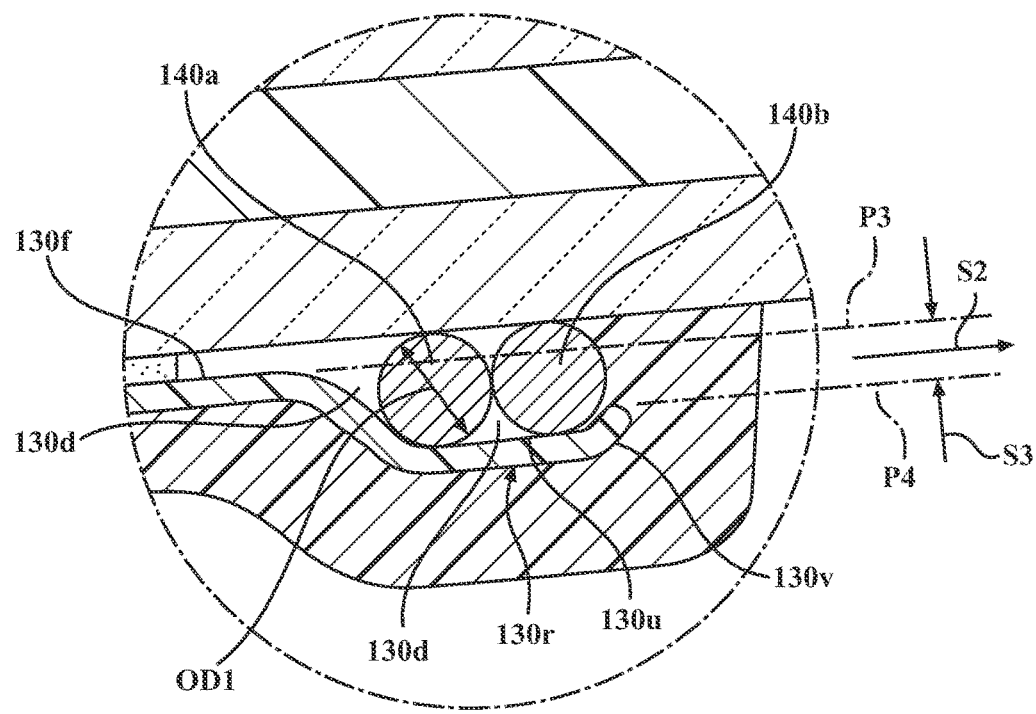
FIG. 5A is a magnified view of a portion of the edge view of FIG. 5.

FIG. 4 is a schematic perspective view of a portion of the electrically-enabled glass assembly 20 incorporating another embodiment 130 of a wire-mounting device structured for securing a portion of at least one wire 40 to a piece of glass 22. The wire-mounting device 130 is shown attached to the piece of glass 22. FIG. 5 is a schematic partial cross-sectional edge view of the portion of the glass assembly shown in FIG. 4. FIG. 5A is a magnified view of a portion of the edge view of FIG. 5.

Referring to FIGS. 4-5A, a wire-engaging portion 130a of the wire-mounting device 130 may include a flap 130r extending from an end of the positioning portion 130b in a direction S2 away from the positioning portion 130b. The flap 130r may define a wire-receiving cavity 130d opening in the direction S2 extending away from the positioning portion 130b. As seen in FIGS. 4-5A, the wire-engaging portion 130a of the wire-mounting device 130 may be adapted (by increasing the length of flap 130r) to secure more than one wire to the surface of the piece of glass. FIGS. 4-5A show a wire-engaging flap 130r adapted to secure two wires 140a, 140b to the piece of glass 22. An interior surface 130u of the flap 130r may be structured (with respect to the outer diameter(s) of wire(s) 140a, 140b to be mounted on the piece of glass 22) to directly, physically contact the wire(s) so as to press portion(s) of the wire(s) against the surface 22s of the piece of glass 22 when the wire-mounting device positioning portion 130b is attached to the piece of glass 22. In addition, an overhang 130v may extend from an end of the flap 130r. Also, as previously described with respect to the wire-mounting device 30, the positioning portion 130b may have a flat facing surface 130f structured to face in a direction toward the piece of glass 22 when the positioning portion 130b is secured to the piece of glass. The facing surface 130f may define a first plane P3. A minimum distance S3 between the first plane P3 and a second plane P4 extending through an end of the overhang 130v and parallel to the first plane P3 may be structured to be less than an outer diameter OD1 of the portion(s) of the wire(s) 140a, 140b to be secured to the piece of glass 22. Provision of the overhang 130v may help ensure that any wire(s) located in the wire-receiving cavity 130d when the positioning portion 130b is attached to the piece of glass 22 will be retained inside the wire-receiving cavity 130d during overmolding, because the wire outer diameter OD1 will exceed the size S3 of the cavity opening formed between the overhang 130v and the piece of glass 22.

Figure 6C:
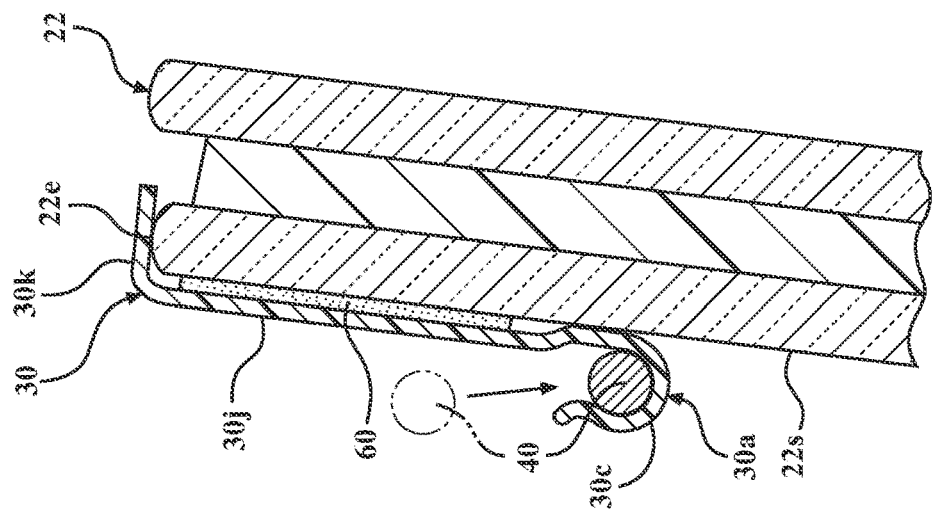
FIG. 6C is the schematic partial side view of FIG. 6A, showing a final step of the first exemplary method of attaching an embodiment of the wire-mounting device to the piece of glass.
Figure 6B:
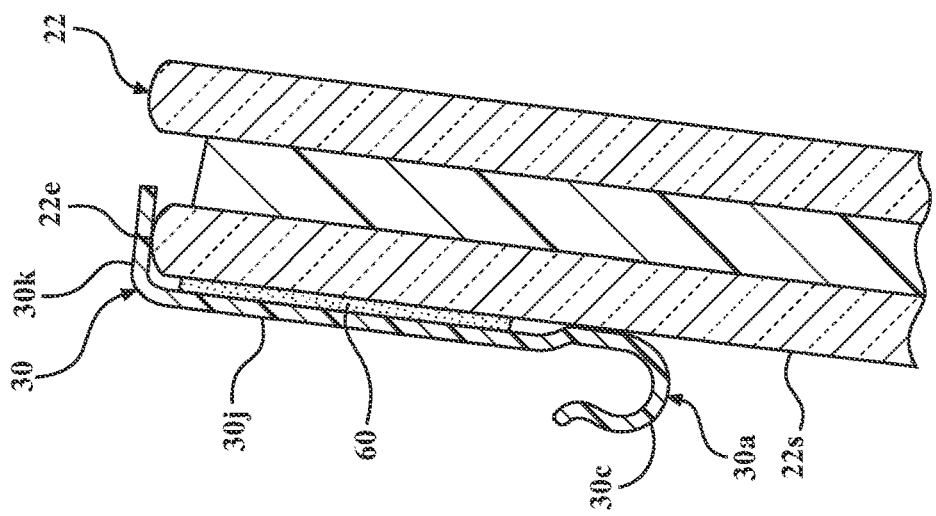
FIG. 6B is the schematic partial side view of FIG. 6A, showing another step of the first exemplary method of attaching an embodiment of the wire-mounting device to the piece of glass.
Figure 6A:
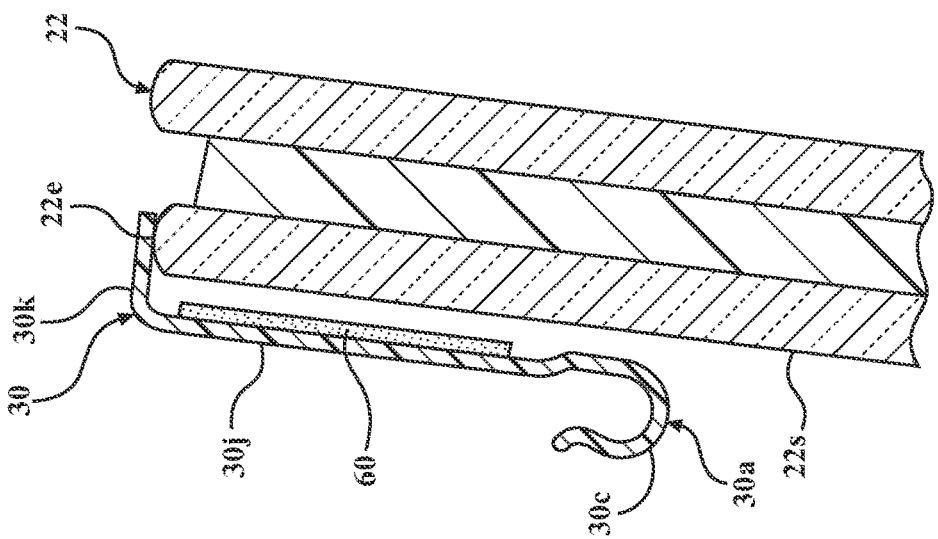
FIG. 6A is a schematic partial side view of the electrically-enabled glass assembly shown in FIGS. 1-3, showing a first step of a first exemplary method of attaching an embodiment of the wire-mounting device to the piece of glass.

FIGS. 6A-6C are schematic partial side views of the electrically-enabled glass assembly 20 shown in FIGS. 1-3, illustrating a first exemplary method for attaching an embodiment of the wire-mounting device 30 to the piece of glass 22 prior to mounting a wire 40 in the wire-mounting device 30. FIGS. 7A-7B are also schematic partial side views of the electrically-enabled glass assembly 20 shown in FIGS. 1-3, illustrating a second exemplary method for attaching an embodiment of the wire-mounting device 30 to the piece of glass 22 prior to mounting a wire 40 in the wire-mounting device 30. In the views shown in FIGS. 6A-7B, the wire-mounting device 30 is structured to be attached to the piece of glass 22 using a device securement element 60 in the form of a piece of double-sided tape. However, alternative attachment methods may also be used.

Referring to FIG. 6A, in a first step of the first exemplary method, a device securement element 60 along a connecting portion 30j of the wire-mounting device 30 is enabled. In one or more arrangements, the step of "enabling" the device securement element 60 along the connecting portion 30j may comprise putting the device securement element 60 in a condition in which it will secure the connecting portion 30j to the piece of glass 22 when the device securement element 60 is brought into direct, physical contact with the piece of glass 22. For example, in a case where the device securement element 60 is in the form of a piece of double-sided tape pre-applied to the wire-mounting device connecting portion 30j, the device securement element 60 may be enabled by peeling off a backing layer of the tape facing the piece of glass 22. Then, moving the wire-mounting device 30 to bring the exposed double-sided tape into contact with the piece of glass 22 will operate to attach or secure the wire-mounting device 30 to the piece of glass 22. In a case where the device securement element 60 is in the form of an adhesive (such as a glue or epoxy), the device securement element 60 may be enabled by simply applying a desired quantity of the adhesive material to the connecting portion 30j. Then moving the wire-mounting device 30 to bring the adhesive into contact with the piece of glass 22 will operate to attach or secure the wire-mounting device 30 to the piece of glass.

In a next step (also in FIG. 6A), a catch portion 30k of the wire-mounting device 30 may be positioned so as to engage an edge 22e of the piece of glass 22. For example, a user may directly position the catch portion 30k in contact with the glass edge 22e. Engagement of the catch portion 30k with the edge 22e of the piece of glass 22 may operate to locate the wire at a predetermined distance DW from the edge of the glass when the wire is mounted in the wire-mounting device 30 attached to the glass 22. In a next step (FIG. 6B), the connecting portion 30j of the wire-mounting device 30 may be moved so that the device securement element 60 directly, physically contacts the piece of glass 22 along surface 22s, thereby securing the wire-mounting device connecting portion 30j to the piece of glass 22. In a final step (FIG. 6C), a wire 40 may be mounted in the hook 30c of the wire-engaging portion 30a.

Referring to FIG. 7A, in a variation on the first method, the step of positioning the catch portion 30k of the wire-mounting device 30 so as to engage the edge 22e of the piece of glass 22 may include a first step of positioning the wire-mounting device 30 so that the catch portion 30k and the wire-engaging portion 30a are both in contact with the surface 22s of the piece of glass 22, with the catch portion 30k residing between the edge 22e of the piece of glass 22 and the wire-engaging portion 30a. In a next step, a user may apply pressure to the wire-mounting device 30 in a direction S6 toward the edge 22e of the piece of glass 22 so as to slide the catch portion 30k along the surface 22s of the piece of glass 22 toward the edge 22e until the catch portion 30k moves past the edge 22e and over the edge (FIG. 7B), thereby bringing the device securement element 60 along the connecting portion 30j into direct physical contact with the surface 22s of the piece of glass 22 and securing the wire-mounting device connecting portion 30j to the piece of glass 22.

The schematic plan view of FIG. 1 shows a wire 40 secured to a piece of glass 22 using wire-mounting devices 30 structured as shown in FIGS. 1-3 and having connecting portions 30j of the same lengths, to secure all portions of the wire 40 at the same distance DW from the edge 22e of the piece of glass 22. After positioning and attachment of the wire-mounting devices 30 to the piece of glass 22 and mounting of the wire 40 in the wire-mounting devices 30, an overmold 50 (FIG. 3) may be applied along the edge of the piece of glass 22 to encapsulate the wire attachments. Referring to FIG. 8, in an alternative arrangement, wire-mounting devices 30 structured as shown in FIGS. 1-3 and having connecting portions 30j of equal lengths D1 may be attached to the piece of glass 22 as previously described to secure associated portions of the wire 40 to the glass at a first distance DW from the glass edge 22e. In addition, wire-mounting devices 130 structured as shown in FIGS. 4 and 5 and having connecting portions 130j of equal lengths may be attached to the piece of glass 22 as previously described to secure associated portions of the wire 40 to the glass at a second distance DW2. The lengths of the connecting portions 130j of wire-mounting devices 130 may be greater than the lengths of the connecting portions 30j of wire-mounting devices 30, so that the wire 40 is spaced apart farther from the edge 22e at locations where the wire 40 is secured by the wire-mounting devices 130. The variation in spacing of the wire portions from the glass edge 22e enables portions of the wire 40 to be diverted as needed from the straight line wire path shown in FIG. 1, to accommodate particular features of the glass 22 or other elements attached to the glass, for example. Also, because the wire-receiving cavities in the different wire-mounting devices 30 and 130 open in different directions with respect to the positioning portions of the respective wire-mounting devices, a certain degree of tension can be maintained in the wire 40 during mounting when the wire-mounting devices 30 and 130 are arranged in an alternating fashion. After positioning and attachment of the wire-mounting devices 30, 130 to the piece of glass 22 and mounting of the wire 40 in the wire-mounting devices, an overmold 50 may be applied along the edge 22e of the piece of glass 22 to encapsulate the wire attachments.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A wire-mounting device for securing a portion of at least one wire to a piece of glass, the device comprising:
    a wire-engaging portion; and
    a positioning portion extending from the wire-engaging portion and structured to contact an edge of the piece of glass to position the wire-engaging portion at a predetermined distance from the edge of the piece of glass,
    the wire-engaging portion including a hook defining a wire-receiving cavity opening in a direction extending toward the positioning portion.

2. The device of claim 1, wherein the hook is structured to exert a gripping force along at least a semi-circular exterior portion of the at least one wire when the portion of the at least one wire is received in the wire-receiving cavity.

3. The device of claim 1, wherein the positioning portion has a flat facing surface structured to face in a direction toward the piece of glass when the positioning portion is secured to the piece of glass, the facing surface defining a first plane P1, and wherein the hook is structured so that a second flat plane P2 intersecting an outer surface of the hook and extending parallel to the first plane is spaced apart a predetermined distance from the first plane.

4. The device of claim 1, wherein the positioning portion comprises:
    a catch portion structured to engage the edge of the piece of glass; and
    a connecting portion extending between the catch portion and the wire-engaging portion.

5. A wire-mounting device for securing a portion of at least one wire to a piece of glass, the device comprising:
    a wire-engaging portion; and
    a positioning portion extending from the wire-engaging portion and structured to contact an edge of the piece of glass to position the wire-engaging portion at a predetermined distance from the edge of the piece of glass,
    wherein the wire-engaging portion comprises a flap extending from an end of the positioning portion in a direction away from the positioning portion.

6. The device of claim 5, wherein an overhang extends from an end of the flap, wherein the positioning portion has a flat facing surface structured to face in a direction toward the piece of glass when the positioning portion is secured to the piece of glass, the facing surface defining a first plane, wherein a minimum distance between the first plane and a second plane extending through an end of the overhang and parallel to the first plane is structured to be less than an outer diameter of the portion of the at least one wire.

7. The device of claim 5, wherein the flap defines a wire-receiving cavity opening in a direction extending away from the positioning portion.

8. A wire-mounting device for securing a portion of at least one wire to a piece of glass, the device comprising:
    a wire-engaging portion; and
    a positioning portion extending from the wire-engaging portion and structured to contact an edge of the piece of glass to position the wire-engaging portion at a predetermined distance from the edge of the piece of glass,
    wherein the positioning portion has a flat facing surface structured to face in a direction toward the piece of glass when the positioning portion is secured to the piece of glass, and wherein the wire-mounting device further comprises a device securement element positioned along the positioning portion facing surface and structured to attach the positioning portion to the piece of glass.

9. The device of claim 8, wherein the device securement element comprises a piece of double-sided tape secured to the positioning portion facing surface.

10. The device of claim 8, wherein the device securement element comprises a quantity of adhesive applied to the positioning portion facing surface.

11. An electrically-enabled glass assembly for a vehicle, the assembly comprising:
   a piece of glass;
   a wire-mounting device engaging an edge of the piece of glass and a portion of at least one wire so as to secure the portion of the at least one wire at a predetermined distance from the edge of the piece of glass; and
   another wire-mounting device engaging the edge of the piece of glass and another portion of the at least one wire so as to secure the other portion of the at least one wire at another predetermined distance from the edge of the piece of glass, the other predetermined distance being greater than the predetermined distance.

12. The assembly of claim 11, wherein the at least one wire-mounting device includes a hook engaging the portion of the at least one wire so as to exert a gripping force along at least a semi-circular exterior portion of the at least one wire.

13. The assembly of claim 11, wherein the at least one wire-mounting device includes a flap engaging the portion of the at least one wire so as to press the portion of the at least one wire against a surface of the piece of glass.

14. The assembly of claim 11, wherein the wire-mounting device defines a wire-receiving cavity opening in a direction extending toward the edge of the piece of glass, and the other wire-mounting device defines a wire-receiving cavity opening in a direction extending away from the edge of the piece of glass.

15. A method of attaching at least one wire to a piece of glass for fabricating an electrically-enabled glass assembly, the method comprising steps of:
   enabling a device securement element along a positioning portion of a wire-mounting device structured to be securable to the piece of glass;
   positioning a catch portion of the wire-mounting device so as to engage an edge of the piece of glass;
   moving the positioning portion of the wire-mounting device so that the device securement element contacts the piece of glass, thereby securing the wire-mounting device positioning portion to the piece of glass; and
   mounting a wire to the piece of glass by a wire-engaging portion of the wire-mounting device, the wire-engaging portion including one of a hook defining a wire-receiving cavity opening in a direction extending toward the positioning portion, and a flap extending from an end of the positioning portion in a direction away from the positioning portion.

16. The method of claim 15 wherein the step of positioning a catch portion of the wire-mounting device so as to engage an edge of the piece of glass comprises steps of:
   positioning the wire-mounting device so that the catch portion and the wire-engaging portion are in contact with a surface of the piece of glass, with the catch portion residing between the edge of the piece of glass and the wire-engaging portion; and
   applying pressure to the wire-mounting device in a direction toward the edge of the piece of glass so as to slide the catch portion along the surface of the piece of glass toward the edge of the piece of glass until the catch portion moves past the edge and over the edge, thereby bringing the device securement element along the positioning portion into contact with the surface of the piece of glass and securing the wire-mounting device positioning portion to the piece of glass.

17. An electrically-enabled glass assembly for a vehicle, the assembly comprising a wire-mounting device in accordance with claim 1.

18. An electrically-enabled glass assembly for a vehicle, the assembly comprising a wire-mounting device in accordance with claim 5.

\* \* \* \* \*